US012663792B2

(12) United States Patent
Fields et al.

(10) Patent No.: US 12,663,792 B2
(45) Date of Patent: Jun. 23, 2026

(54) MANUAL CONTROL RE-ENGAGEMENT IN AN AUTONOMOUS VEHICLE

(71) Applicant: STATE FARM MUTUAL AUTOMOBILE INSURANCE COMPANY, Bloomington, IL (US)

(72) Inventors: Brian Mark Fields, Phoenix, AZ (US); Kristopher Keith Gaudin, Bloomington, IL (US); Leo Nelson Chan, Normal, IL (US); Aaron Williams, Congerville, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 70 days.

(21) Appl. No.: 18/923,277

(22) Filed: Oct. 22, 2024

(65) Prior Publication Data

US 2025/0044794 A1 Feb. 6, 2025

Related U.S. Application Data

(60) Continuation of application No. 18/206,414, filed on Jun. 6, 2023, now Pat. No. 12,130,622, which is a
(Continued)

(51) Int. Cl.
*G05D 1/00* (2024.01)
*B60W 30/14* (2006.01)
(Continued)

(52) U.S. Cl.
CPC ......... *G05D 1/0061* (2013.01); *B60W 30/143* (2013.01); *B60W 30/17* (2013.01);
(Continued)

(58) Field of Classification Search
CPC ..................................................... G05D 1/0061
See application file for complete search history.

(56) References Cited

U.S. PATENT DOCUMENTS 6,313,749 B1 * 11/2001 Horne .................... G08B 21/06
340/576
7,102,496 B1 * 9/2006 Ernst, Jr. .......... G08G 1/096725
340/436
(Continued)

FOREIGN PATENT DOCUMENTS

EP 3239686 A1 11/2017
EP 3578433 B1 8/2020
(Continued)

OTHER PUBLICATIONS

U.S. Appl. No. 15/957,637, "Manual Control Re-Engagement in an Autonomous Vehicle" filed Apr. 19, 2018.
(Continued)

*Primary Examiner* — Shelley Chen
(74) *Attorney, Agent, or Firm* — MARSHALL, GERSTEIN & BORUN LLP

(57) ABSTRACT

Vehicles may have the capability to navigate according to various levels of autonomous capabilities, the vehicle having a different set of autonomous competencies at each level. In certain situations, the vehicle may shift from one level of autonomous capability to another. The shift may require more or less driving responsibility from a human operator. Sensors inside the vehicle collect human operator parameters to determine an alertness level of the human operator. An alertness level is determined based on the human operator parameters and other data including historical data or human operator-specific data. Notifications are presented to the user based on the determined alertness level that are more or less intrusive based on the alertness level of the human operator and on the urgency of an impending change
(Continued)

100 to autonomous capabilities. Notifications may be tailored to specific human operators based on human operator preference and historical performance.

20 Claims, 11 Drawing Sheets

Related U.S. Application Data continuation of application No. 17/987,639, filed on Nov. 15, 2022, now Pat. No. 11,709,488, which is a continuation of application No. 16/950,558, filed on Nov. 17, 2020, now Pat. No. 11,507,086, which is a division of application No. 15/957,637, filed on Apr. 19, 2018, now Pat. No. 10,935,974.

(51) Int. Cl.

| | |
|---|---|
| *B60W 30/17* | (2020.01) |
| *B60W 50/14* | (2020.01) |
| *B60W 60/00* | (2020.01) |
| *G05D 1/81* | (2024.01) |
| *B60W 40/08* | (2012.01) |
| *B60W 50/00* | (2006.01) |

(52) U.S. Cl.

CPC ........ *B60W 50/14* (2013.01); *B60W 60/0051* (2020.02); *B60W 60/0053* (2020.02); *G05D 1/0088* (2013.01); *G05D 1/81* (2024.01); *B60W 2040/0863* (2013.01); *B60W 2050/007* (2013.01); *B60W 2050/0072* (2013.01); *B60W 2050/143* (2013.01); *B60W 2050/146* (2013.01); *B60W 2556/65* (2020.02)

(56) References Cited

U.S. PATENT DOCUMENTS

| | | | | |
|---|---|---|---|---|
| 9,830,748 | B2 | 11/2017 | Rosenbaum | |
| 9,990,782 | B2 | 6/2018 | Rosenbaum | |
| 10,241,509 | B1 * | 3/2019 | Fields | A61B 5/02028 |
| 10,269,190 | B2 | 4/2019 | Rosenbaum | |
| 10,289,113 | B2 * | 5/2019 | Perkins | B60W 30/182 |
| 10,467,824 | B2 | 11/2019 | Rosenbaum | |
| 11,227,452 | B2 | 1/2022 | Rosenbaum | |
| 11,407,410 | B2 | 8/2022 | Rosenbaum | |
| 11,524,707 | B2 | 12/2022 | Rosenbaum | |
| 11,594,083 | B1 | 2/2023 | Rosenbaum | |
| 2010/0025144 | A1 * | 2/2010 | Huang | B62D 6/002 |
| | | | | 180/401 |
| 2011/0022298 | A1 * | 1/2011 | Kronberg | G01C 21/3484 |
| | | | | 701/532 |
| 2011/0115617 | A1 * | 5/2011 | Bennett | B62D 1/046 |
| | | | | 340/439 |
| 2013/0069773 | A1 * | 3/2013 | Li | B60W 40/09 |
| | | | | 340/436 |
| 2017/0090478 | A1 * | 3/2017 | Blayvas | G07C 5/0808 |
| 2017/0210388 | A1 * | 7/2017 | Wieskamp | G07C 5/0808 |
| 2017/0337813 | A1 * | 11/2017 | Taylor | G05D 1/0285 |
| 2018/0032072 | A1 * | 2/2018 | Hoye | B60K 28/02 |
| 2018/0194349 | A1 * | 7/2018 | McGill, Jr. | B60W 30/10 |
| 2018/0231976 | A1 * | 8/2018 | Singh | B60W 60/0051 |
| 2018/0257682 | A1 * | 9/2018 | Brooks | B61L 3/006 |
| 2019/0278263 | A1 * | 9/2019 | Mason | B60W 50/12 |
| 2020/0198465 | A1 * | 6/2020 | Tanabe | B60N 2/14 |
| 2022/0092893 | A1 | 3/2022 | Rosenbaum | |
| 2022/0185109 | A1 * | 6/2022 | Tanabe | B60W 50/16 |
| 2022/0340148 | A1 | 10/2022 | Rosenbaum | |
| 2023/0060300 | A1 | 3/2023 | Rosenbaum | |

FOREIGN PATENT DOCUMENTS

| | | | |
|---|---|---|---|
| EP | 3730375 | B1 | 10/2021 |
| EP | 3960576 | A1 | 3/2022 |
| EP | 4190659 | A1 | 6/2023 |
| EP | 4190660 | A1 | 6/2023 |
| FR | 3041778 | A1 | 3/2017 |
| JP | 2018206366 | A | 12/2018 |
| WO | WO-2019123022 | A1 | 6/2019 |
| WO | WO-2019123023 | A1 | 6/2019 |

OTHER PUBLICATIONS

U.S. Appl. No. 16/950,588, "Manual Control Re-Engagement in an Autonomous Vehicle" filed on Nov. 17, 2020.

U.S. Appl. No. 15/957,637, "Manual Control Re-Engagement in an Autonomous Vehicle" filed April1 19, 2018.

U.S. Appl. No. 16/950,558 "Manual Control Re-Engagement in an Autonomous Vehicle" filed Nov. 17, 2020.

* cited by examiner

100

200

DANGER: PREPARE TO ENGAGE
MANUAL CONTROL !!! (40 SEC.)

400

402

800

STILL AWAKE? PUSH HERE TO CONFIRM ALERTNESS.

900

902

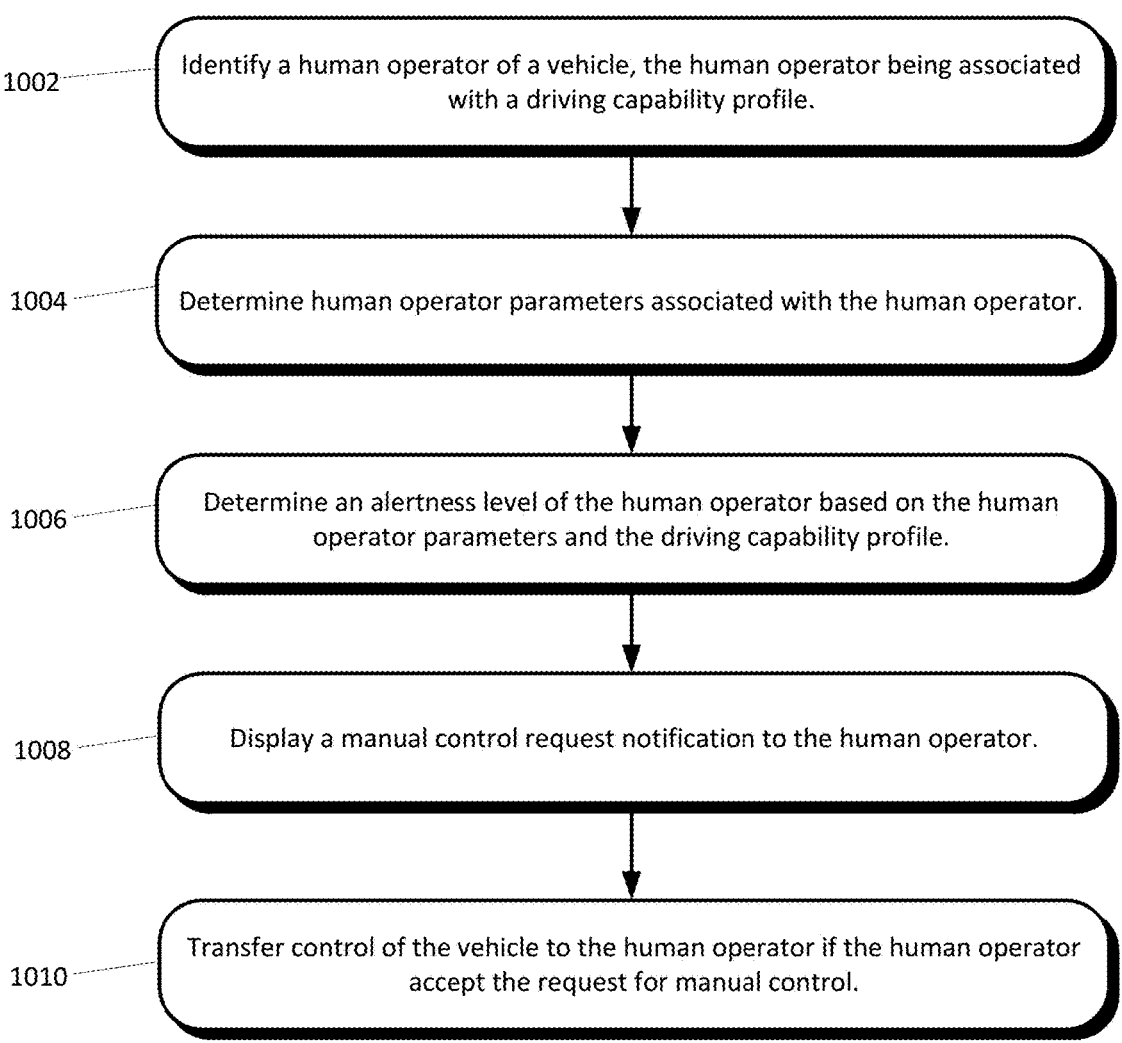

1000

1002 ······ Identify a human operator of a vehicle, the human operator being associated with a driving capability profile.

1004 ······ Determine human operator parameters associated with the human operator.

1006 ······ Determine an alertness level of the human operator based on the human operator parameters and the driving capability profile.

1008 ······ Display a manual control request notification to the human operator.

1010 ······ Transfer control of the vehicle to the human operator if the human operator accept the request for manual control.

1102 — Navigate a vehicle according to a first level of autonomous capability.

1104 — Receive a request to operate the vehicle according to a second level of autonomous capability.

1106 — Notify a human operator with a notification of an impending change in vehicle capability.

1108 — Navigate the vehicle according to the second level of autonomous capability.

MANUAL CONTROL RE-ENGAGEMENT IN AN AUTONOMOUS VEHICLE

CROSS-REFERENCE TO RELATED APPLICATIONS

This application is a continuation of U.S. application Ser. No. 18/206,414, filed on Jun. 6, 2023 entitled "Manual Control Re-Engagement in an Autonomous Vehicle," which is a continuation of U.S. application Ser. No. 17/987,639, filed on Nov. 15, 2022 entitled "Manual Control Re-Engagement in an Autonomous Vehicle," which is a continuation of U.S. application Ser. No. 16/950,558, filed on Nov. 17, 2020 entitled "Manual Control Re-Engagement in an Autonomous Vehicle," which is a divisional of U.S. application Ser. No. 15/957,637, filed on Apr. 19, 2018 entitled "Manual Control Re-Engagement in an Autonomous Vehicle." The entirety of each of the foregoing applications is expressly incorporated herein by reference.

BACKGROUND

Vehicles may be equipped with sensors and processing and communication capabilities that allow the vehicle to navigate autonomously without human intervention. Autonomous vehicle navigation is not possible, however, under all circumstances. In some situations, a vehicle may lack the capability to navigate autonomously such as adverse or extreme weather conditions, in the event of the loss of vehicle sensors or a communications link, under disaster conditions, due to vehicle collisions in the area, etc. When a vehicle can no longer navigate autonomously, control of the vehicle may be returned to a human operator. Transfer of control of the vehicle to a human represents a potential danger due to the vehicle's autonomous nature-a human operator who has been traveling in the vehicle may be inattentive to road conditions and unprepared to make the decisions and exercise the motor control needed to safely operate the vehicle.

SUMMARY OF THE DISCLOSURE

This summary is provided to introduce a selection of concepts in a simplified form that are further described in the Detailed Descriptions. This summary is not intended to identify key features or essential features of the claimed subject matter, nor is it intended to be used to limit the scope of the claimed subject matter.

Systems and methods are disclosed for requesting engagement of manual control in a vehicle. The vehicles may have the capability to navigate according to various levels of autonomous capabilities, where the vehicle has a different set of autonomous competencies at each level. In certain situations, the vehicle may shift from one level of autonomous capability to another. The shift may require more or less driving responsibility from a human operator. Sensors inside the vehicle may collect human operator parameters to determine an alertness level of the human operator. An alertness level may be determined based on the human operator parameters and other data including historical data or human operator-specific data. Notifications may be presented to the user based on the determined alertness level that are more or less intrusive based on the alertness level of the human operator and on the urgency of an impending change to autonomous capabilities. Notifications may be tailored to specific human operators based on human operator preference and historical performance.

In one aspect, a method of requesting engagement of manual control in a vehicle is disclosed. The method may include identifying a human operator of the vehicle, the human operator being associated with a driving capability profile; determining human operator parameters associated with the human operator of the vehicle; and determining an alertness level of the human operator based on the human operator parameters and the driving capability profile. The method may also include receiving an indication to transfer control of the vehicle to the human operator; displaying a manual control request notification to the human operator, the manual control request notification communicating a request for manual control, the manual control request notification further being based on the determined alertness level; and transferring control of the vehicle to the human operator if the human operator accepts the request for manual control.

In another aspect, a system for transferring control of a vehicle to a human operator is disclosed. The system may include an evaluator configured to evaluate readiness of a human operator of a vehicle, the evaluator including one or more sensors; a vehicle security arbiter configured to determine a security threat to the vehicle; and a notification server configured to display a first manual control request notification to the human operator, the first manual control request notification being based at least in part on the readiness of the human operator and the security threat to the vehicle. The notification server being further configured to display a second manual control request notification to the human operator, the second manual control request notification being different from the first manual control request notification; and the vehicle security arbiter being further configured to transfer control of the vehicle to the human operator.

In yet another aspect, a method is disclosed for transitioning control of a vehicle. The method may include navigating a vehicle according to a first level of autonomous capability, the first level of autonomous capability defining a first set of autonomous competencies of the vehicle; receiving a request to operate the vehicle according to a second level of autonomous capability within a time period, the second level of autonomous capability defining a second set of autonomous competencies, the second set of autonomous competencies being different than the first set of autonomous competencies; and notifying a human operator of the vehicle with a notification of an impending change in vehicle capability to the second level of autonomous capability, the notification depending at least in part on differences between the first set of autonomous competencies and the second set of autonomous competencies. The method may also include navigating the vehicle according to the second level of autonomous capability.

The methods may be implemented via computer systems, and may include additional, less, or alternate actions or functionality. Systems or computer-readable media storing instructions for implementing all or part of the method described above may also be provided in some aspects. Systems for implementing such methods may include one or more of the following: a special-purpose computing device, a personal electronic device, a mobile device, a wearable device, a processing unit of a vehicle, a remote server, one or more sensors, one or more communication modules configured to communicate wirelessly via radio links, radio frequency links, and/or wireless communication channels, and/or one or more program memories coupled to one or more processors of the personal electronic device, processing unit of the vehicle, or remote server. Such program memories may store instructions to cause the one or more processors to implement part or all of the method described above. Additional or alternative features described herein below may be included in some aspects.

This summary is provided to introduce a selection of concepts in a simplified form that are further described in the Detailed Descriptions. This summary is not intended to identify key features or essential features of the claimed subject matter, nor is it intended to be used to limit the scope of the claimed subject matter.

Advantages will become more apparent to those of ordinary skill in the art from the following description of the preferred aspects, which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF THE DRAWINGS

FIG. 10 illustrates example operations for requesting engagement of manual control in a vehicle.

DETAILED DESCRIPTIONS

Figure 1:
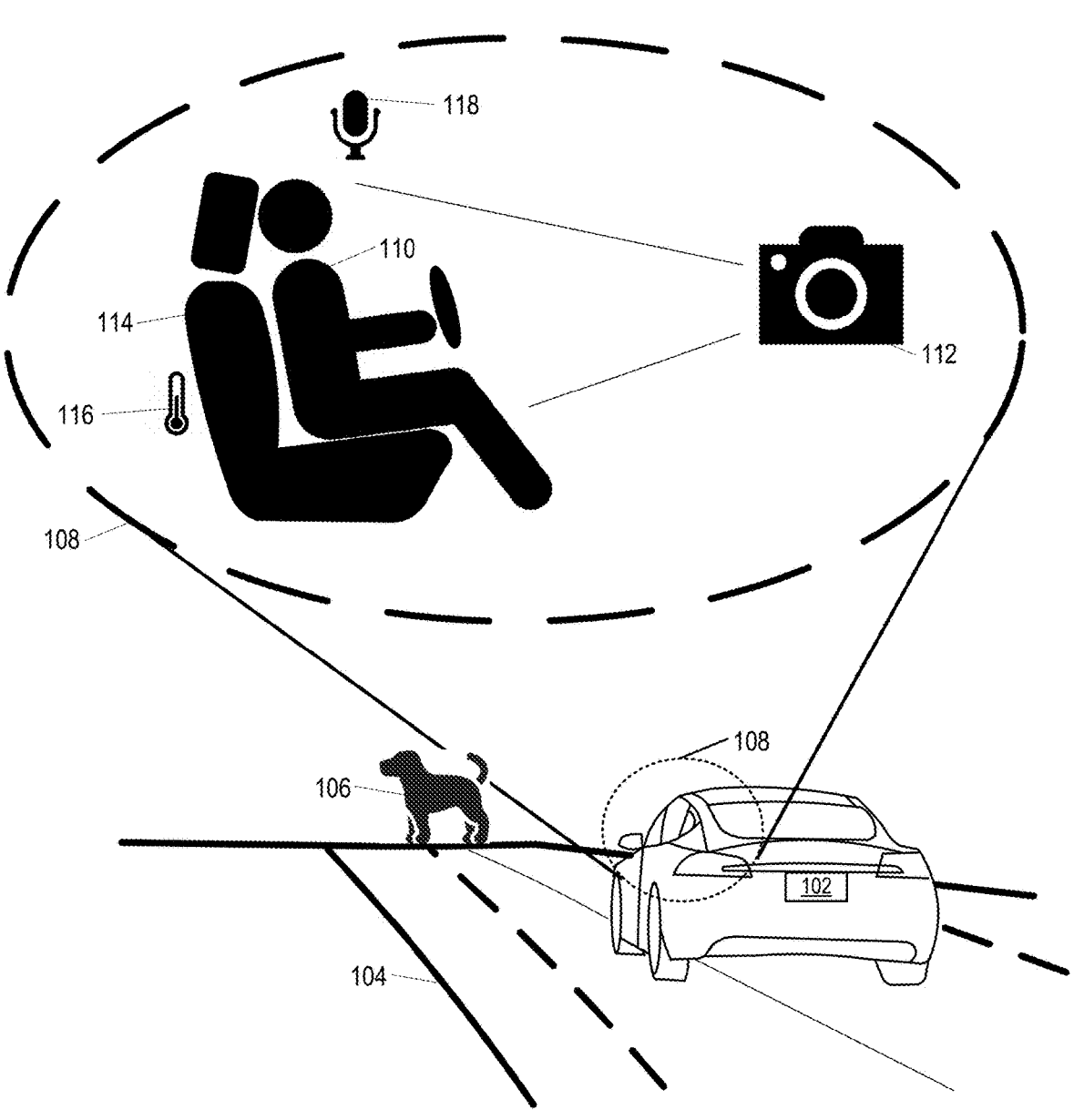
FIG. 1 is a schematic diagram of an example system for manual control re-engagement in a vehicle.

Autonomous vehicles may exercise a range of capabilities when navigating on open road conditions. An autonomous vehicle need not be viewed as operating purely autonomously or purely manually. The Society of Automotive Engineers (SAE) has identified at least six levels of autonomous vehicle capability ranging from no driving automation (Level 0) to full automation (Level 5). As a vehicle moves up the levels of capability, additional autonomous competencies are added to the vehicle's set of skills (e.g., adaptive cruise control, parking assist, lane assist, traffic jam assist, conditional automation, high automation, full automation, etc.).

At the various points on the vehicle's autonomous skill ladder, a human operator exercises an appropriate level of manual control. If a vehicle supplies only adaptive cruise control or parking assist capabilities, then the human operator must exercise a high level of manual control and is responsible for any and all non-autonomous aspects of the vehicle. If a vehicle supplies high or full automation, on the other hand, a human operator may participate at a low level, or even not at all, in navigating the vehicle. If a vehicle exercises a high level of autonomous capability (e.g., Levels 4 or 5), a human operator may become disengaged from the road and unaware of the road environment surrounding the vehicle. The human user may become focused on non-driving tasks (e.g., reading, working, playing games, conversations with other passengers, phone calls, etc.). A human operator may even go to sleep and lose all contact with controlling the vehicle.

It may be desirable for an autonomous vehicle to shift from one level of autonomous capability to another, such as due to changing road conditions, weather conditions, due to a vehicle crash, disaster or emergency situation, etc. To the extent the human operator will need to change her involvement in piloting the vehicle when the vehicle shifts between levels of automation, she must be notified of the impending change. A variety of notification types are used in the system for manual control re-engagement to communicate with the human operator regarding upcoming changes in the human operator's responsibilities in piloting the vehicle. A notification may be more intrusive to the human operator or less intrusive to the human operator depending on the urgency of the impending change to the vehicle's capabilities and the human operator's responsibilities.

Different human operators will respond differently to notifications of changes to the vehicle's autonomous capabilities. Human operators exhibit differences from one another in terms of attention span, ability to multitask, ability to shift focus from one activity to another after receiving a notification, etc. To some extent, these differences are natural characteristics of the human operators themselves (e.g., some people are more likely than others to become engrossed in reading a book and may take more time to respond to a notification of impending vehicle autonomous capability change than other people who may tend not to become engrossed in reading a book while riding in a car). In other situations, a human operator's ability to acknowledge a notification and prepare to exercise more or less control over the vehicle may depend on other aspects of the human operator that may change over time (e.g., intoxication level, how well rested the human operator is, whether the human operator has become focused on another activity or remains aware of the vehicle's surroundings, the health of the human operator, etc.). In yet other situations, a human operator's ability to acknowledge a notification and prepare to exercise more or less control over the vehicle may change slowly over time (e.g., a human operator's eyesight may deteriorate over time, motor control deteriorates with age, etc.).

A change to a vehicle's autonomous capability may also have a variable time target in which the change should be made. Some changes to a vehicle's autonomous capabilities must be made quickly, such as in emergency situations (e.g., a vehicle crash or other rapidly approaching road hazard, if the human operator experiences an emergent medical or health problem, etc.). Other changes to a vehicle's autonomous capabilities need not be made quickly (e.g., if adverse or extreme weather conditions are forecasted but not yet experienced, if a human operator is nearing the limits of her ability to stay awake, if a human operator experiences abnormal but not threatening health issues, etc.).

A vehicle may receive an indication from third-party sources of an impending road hazard and may determine the urgency of altering the vehicle's autonomous capabilities on its own. Vehicles may communicate wirelessly with one another in to relay updates to one another regarding changing road conditions as experienced by the vehicles them selves. The vehicles may communicate according to a peer-to-peer network in which the vehicles connect with one another directly (e.g., a swarm) or a centralized party may collect information from the vehicles, optionally process the information, and selectively provide relevant information to vehicles as the vehicles need it (e.g., client/server). For example, if a vehicle crash occurs on a road and vehicles in the vicinity detect the crash occurrence, the vehicle in the vicinity of the crash may communicate an emergency signal to vehicles approaching the crash site on the road such that those vehicles may take precautions to avoid crashing into any vehicles that are slow, stopped, or otherwise navigating differently than expected due to the crash.

In another implementation, a vehicle may receive an indication from a third-party that the vehicle should alter its autonomous capabilities and may receive a target time period in which to make the change therewith. A centralized authority (e.g., a weather prediction bureau, an insurer, a vehicle owner, a government agency, etc.) may determine that a change should be made to a vehicle's autonomous capabilities based on information regarding the vehicle's environment and may communicate a request to make the change to the vehicle. Such a request may accompany a target time in which to make the change to the vehicle's capabilities.

A vehicle may adjust its autonomous capabilities to increase or decrease the number of autonomous capabilities, depending on the situation the vehicle is in. In some situations, the vehicle maybe ill-suited to safely navigate a situation autonomously, and manual control may be preferable (e.g., navigation in close quarters with other vehicles wherein human communication is needed to coordinate with the operators of other vehicles, if the vehicle experiences a sensor or other hardware failure, if the vehicle loses a communications link, etc.). In other situations, a human operator may be more ill-suited to safely navigate a situation than the vehicle would be autonomously. It may be known that human operators in general, or a specific human operator, is likely to make a mistake that could lead to a crash that an autonomously controlled vehicle would not make. For example, if a vehicle is traveling at a high rate of speed in low visibility conditions (e.g., heavy fog, frequent road elevation changes, blind spots, etc.) and is approaching a sudden traffic jam wherein other vehicles are traveling at a comparatively much slower rate of speed or are stopped on a road, it may be known that human operators are less likely to reduce speed in time than an autonomous vehicle would be. If the vehicle detects such a road condition approaching, it may request the human operator relinquish some or all control of the vehicle to reduce risk of a vehicle crash.

FIG. 1 is a schematic diagram of an example system 100 for detecting human operator parameters in a vehicle. The system 100 includes a vehicle 102 with more than one level of autonomous capabilities navigating on a road 104. The vehicle 102 may include one level of pure manual control and one or more additional levels of enhanced automated control. When the vehicle approaches a potential road hazard 106 or other road conditions under which a change in the autonomous capabilities of the vehicle 102 are warranted, the vehicle 102 may display a notification to the human operator 110 to expect an upcoming or immediate change in the responsibilities of the human operator 110 in piloting the vehicle 102.

One factor in determining the type of notification of a change in autonomous capabilities of the vehicle 102 to the human operator 110 is the current state of the human operator 110. An alertness level of the human operator 110 may be estimated based on objective data collected by sensors inside the vehicle 102 such as the sensors shown in the bubble 108 of the interior of the vehicle 102. In one implementation, an optical imaging device 112 (e.g., a camera) is located inside the vehicle 102 and is directed towards the human operator 110. The camera 112 may capture images of the human operator 110 that may be analyzed to extract human operator parameters used to determine an alertness state of the human operator.

In at least one implementation, the human operator parameters include a body position of the human operator 110. If the human operator 110 is sitting upright in the seat 114 and has her hands on or near a steering wheel, it is likely that the human operator 110 will be more responsive to a change in driving responsibilities than if the human operator 110 is reclined in the seat 114 without hands near the steering wheel. Images captured by the camera 112 may be analyzed by components of the vehicle 102 to determine whether the human operator is in a body position that indicates a greater or lower level of alertness. The camera 112 may capture a series of images of the human operator 110 (e.g., a video) that may be compared by components of the vehicle 102 to determine an activity level of the human operator 110. For instance, if the human operator 110 is asleep, then she will likely exhibit a different movement patterns than a human operator 110 who is awake. Another type of objective data that may be collected by the camera 112 regarding the human operator's alertness and preparedness for accepting a change in driving responsibilities is the activity in which the driver is engaged. If analysis of images captured by the camera 112 indicate that the human operator 110 is holding a book or electronic device, for example, then the human operator 110 is more likely to experience a slower change of focus away from the book and to road conditions than a human operator 110 who is not holding a book or electronic device. The camera 112 may also capture images of the face of the human operator 110 to determine whether her eyes are open or closed, focused on the environment outside of the vehicle 102 or inside the vehicle 102 and other factors such as fatigue.

The human operator parameters may also include non-visual data collected from the interior of the vehicle 102. In at least one implementation, non-visual data includes biometric data of the human operator (e.g., heart rate, breathing rate, body temperature, perspiration rate, etc.). Biometric data may be collected via the seat 114 in the vehicle 102 because the seat is in physical contact with the human operator 110, which facilitates the collection of various types of biometric data. For example, a sensor 116 may be embedded in the seat such that the sensor 116 can collect relevant data (e.g., a thermometer, a heart rate sensor, a breathing rate sensor, a perspiration sensor, etc.).

Other types of sensors that not embedded in the seat 114 may also be used to collect non-visual data for the human operator parameters. In one implementation, an audio sensor 118 detects sounds inside the vehicle 102. If a human operator is speaking to another occupant of the vehicle 102 or on a phone, the human operator's speech will be recognized by the audio sensor 118. The human operator parameters may then reflect that the human operator 110 is awake and likely somewhat but not completely focused on the environment surrounding the vehicle 102. The sensor 118 may also detect other types of sounds such as the human operator 110 moving inside the vehicle 102, suggesting an activity level of the human operator 110.

Human operator parameters may also include historical information regarding the human operator 110. In one implementation, components of the vehicle 102 compile historical data regarding the human operator 110. For example, the speed at which the human operator 110 responded to various notifications of an upcoming change to the vehicle's autonomous capabilities (e.g., notifications of various levels of intrusiveness, audio notifications, video notifications, haptic feedback notifications, etc.) As another example, the vehicle 102 may compile, how well the human operator 110 reacted to various types of road conditions and potential hazards (e.g., how often does the human operator 110 engage in emergency braking in various road conditions such as snow or rain, does the human operator 110 tend to lane drift at high speed, is the human operator 110 prone to panicked control movements in heavy traffic, etc.).

Historical information regarding the human operator 110 may also be received via a communications device at the vehicle 102 from a third-party. In one implementation, an insurer of the vehicle 110 compiles historical driving information regarding the human operator 110 such as vehicle crash history, vehicle usage history, and biographical data such as age and education level that may be used to determine an alertness level of the human operator 110. For example, if the insurer knows that the human operator 110 usually operates the vehicle early in the morning and never at night, the insurer may determine that that human operator 110 is not accustomed to driving in the middle of the night. If the human operator 110 does drive one day in the middle of the night, then the insurer may determine that this poses a greater than usual safety risk for the particular human operator 110. Other rules may also be applied based on historical data such as young drivers under age 18 pose a greater risk when driving late at night, in adverse weather conditions, when the audio sensor 118 detects multiple young people in the vehicle 102 at the same time, etc.

Figure 2:
FIG. 2 is a time-series schematic diagram of an example system for manual control re-engagement in a vehicle with a human occupant.

FIG. 2 is a time-series schematic diagram of an example system 200 for manual control re-engagement in an autonomous vehicle 206 with a human operator 202. The vehicle 206 includes an image capture device 204 such as a camera. The camera 204 may be directed towards the face of the human operator 202 and images captured thereof. Components of the vehicle 206 may analyze the images of the face of the human operator 202 to identify characteristics of the human operator 202 that are relevant to the human operator parameters used to determine an alertness level of the human operator 202.

The camera 204 may analyze various features of the human operator 202 to supply human operator parameters to the vehicle 206. For example, in a time period before time 210, the eyes of the human operator 202 are open and focused outside the window of the vehicle 206. The camera 204 may capture a series of images of the face of the human operator 202 to detect other features such as rapidity of eye movement, dilation of eye pupils, blinking, etc.

In a time period after time 210, the camera 204 may capture more images of the face of the human operator 202. In a time period after time period 210, the eyes of the human operator 202 are still open, but are focused on a book 214. Images captured by the camera 204 may reflect that the eyes of the human operator 202 are no longer focused on the environment surrounding the vehicle 206, but instead are focused on the book 214. Images captured by the camera 204 may record features of the eyes of the human operator 202 such as eye movements indicating a speed at which the human operator 202 is reading. Slower reading speeds and other eye movements may indicate a fatigue level of the human operator 202.

If the eyes of the human operator 202 are no longer focused on the environment surrounding the vehicle, human operator parameters may include a level of distraction represented by a "score." For example, if the human operator 202 is focused on a book 214, it may be likely that the human operator is engaging in an extended period of perhaps intense concentration on the book 214. The longer the human operator 202 focuses on the book 214, the more likely she is to have a higher level of detachment from her environment. Such behavior may indicate that the human operator parameters should reflect a higher level of distraction. A security arbiter in the vehicle 206 may set a relatively longer period of time that would be expected before the human operator 202 responds to a notification of change to driving responsibility based on a higher distraction score in the human operator parameters. On the other hand, if the human operator 202 is only occasionally focusing on a handheld device (e.g., checking email, etc.), then the distraction of the human operator 202, while still present, may not be considered as distracted as long periods of reading a book 214. In such a case, a lower environmental detachment score may be included in the human input parameters and relied on by other components of the vehicle 206 to alert the human operator of an impending change in driving responsibility and management of shifting the vehicle from one level of autonomous control to another.

At a time period after time 212, the camera 204 may capture additional images of the face of the human operator 202 that indicate the human operator 202 is suffering from fatigue. Images captured by the camera 204 may show that that eye lids of the human operator 202 are not as open as before the human operator 202 began experiencing fatigue. Other eye-based indications include blinking rate, location of eye focus, and eye movement rapidity.

The human operator parameters collected by the camera 204 are used to determine an alertness level of the human operator 202. The determined alertness level may be used to determine whether a change should be made to the autonomous capability level of the 206 and whether the human operator 202 should take on more or less driving responsibility. If the vehicle 206 determines that an approaching road hazard 208 exists and the human operator 202 should take on more driving responsibility, then the vehicle may display a notification to the human operator 202. The type of notification displayed to the human operator 202 and the time period for which the notification should be displayed in advance of an encounter with the road hazard 208 depend on the alertness level of the human operator 202 and the human operator parameters sensed by components of the vehicle 206. For example, if the human operator 202 has a higher alertness level, such as in the time period before time 210, then the notification of a change to the vehicle's autonomous capabilities may be less intrusive or occur closer to the road hazard 208 because it is expected that the human operator 202 will be able to recognize the notification and increase driving responsibility relatively quickly. On the other hand, if an alertness of the human operator 202 is lower due to human operator parameters such as those examples after time 210 and after time 212 (e.g., occupied with another task, experiencing fatigue, etc.), then the notification of a change to the vehicle's autonomous capabilities may be more intrusive or occur farther away from the road hazard 208 because it is expected that the human operator 202 will need relatively more time to recognize the notification and prepare to increase driving responsibility.

Figure 3:
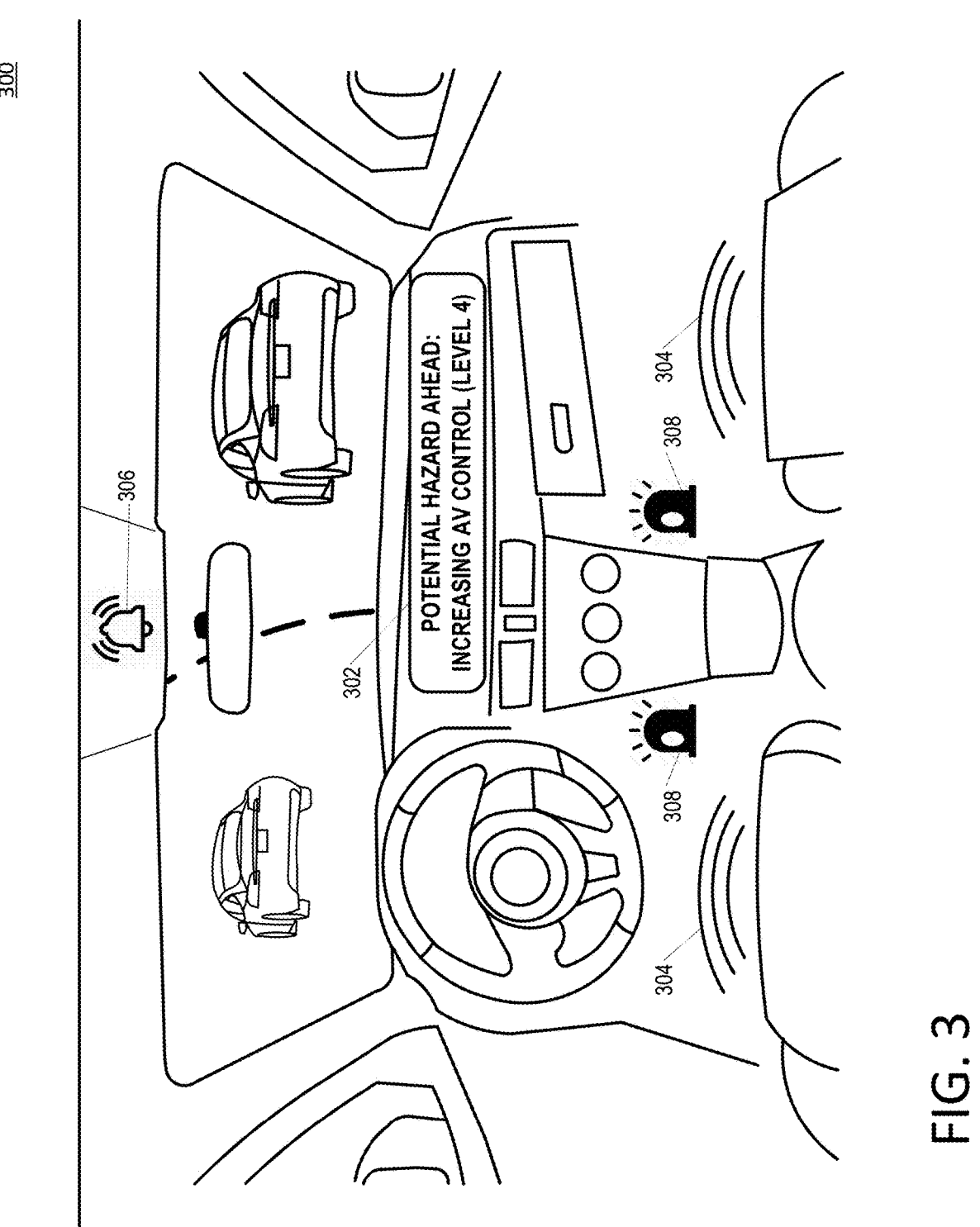
FIG. 3 is an in-vehicle view of an example system for manual control re-engagement in a vehicle.

FIG. 3 is an in-vehicle view of an example system for manual control re-engagement 300 in an autonomous vehicle. Included in the system 300 are a number of types of notifications to alert a human operator that the vehicle may shift to a different level of autonomous capability. The notifications range from less intrusive to a human operator to more intrusive to a human operator, depending on the urgency of the shift to another autonomous vehicle capability level and/or any approaching road hazards. Notifications that the vehicle will shift to a different level of autonomous capability may be tailored to an individual human operator based on collected human operator parameters, such as whether the particular human operator is in an occupied or distracted state, whether the particular human operator tends to respond well to certain types of notifications over other types of notifications, whether the human operator exhibits biomarkers that indicate a reduced capacity for driving (e.g., accelerated or irregular heart rate), whether an impending shift will require a greater or lesser degree of vehicle control on behalf of the human operator, etc.

In the implementation illustrated in FIG. 3, a text notification 302 appears on the dashboard of the vehicle. In one implementation, the text notification 302 alerts a human operator of an impending change to the level of autonomous control exercised by the vehicle. For example, if the vehicle or another entity has determined that a greater degree of autonomous control is better suited to the potential road hazard, then the text notification 302 may indicate to the human operator that the vehicle will include greater autonomous capability (and thus less human responsibility) to navigate the upcoming road hazard. The text notification may include information regarding the road hazard or an impending shift of autonomous vehicle capabilities (e.g., whether the human operator is expected to exercise a greater or lesser degree of control, the urgency of the hazard or shift in capabilities, an expected time until the hazard is encountered or the shift in capabilities is executed, etc.).

The text notification 302 may be adjusted to be more intrusive or less intrusive to the human operator, depending on the nature of the road hazard or change in autonomous capabilities. If the vehicle is preparing to gain more control over navigation of the vehicle with a corresponding reduction in responsibility on the part of the human operator, then the notification 302 need not be highly intrusive because the notification 302 is more of an informational nature. On the other hand, if there is a problem with the vehicle's autonomous capabilities and the human operator is expected to take some or all responsibility for piloting the vehicle, then the notification 302 may be more intrusive to the human operator because the human operator must be made aware of the alert, which could involve interrupting another activity that the human operator may be engaged in (e.g., sleeping, reading, working, in conversation with another occupant of the vehicle, etc.). The text notification 302 may be made more or less intrusive to the human operator by changing text font, flashing text, increasing or decreasing brightness of the text notification 302, using colors to indicate urgency (e.g., red for high urgency, yellow or intermediate urgency, green for lower urgency, etc.)

In the implementation illustrated in FIG. 3, haptic feedback 304 may be used to notify a human operator of an impending road hazard or change in autonomous vehicle capabilities. Haptic feedback 304 may emanate from haptic devices embedded in various parts of the interior of the vehicle such as in the vehicle seats, arm rests, headrests, vehicle and/or media control surfaces, etc. Haptic feedback signals 304 may accompany a text notification 302. Haptic feedback signals 304 may be used to make a notification more intrusive to a human operator. For example, if a human operator is deemed to be in a state of lowered attention span, such as when sleeping, reading a book, etc., then a haptic feedback signal 304 may assist in helping the human operator to "snap out" of her current state and to re-focus on the notification 302 and/or any road or vehicle conditions that require her attention.

Additionally, or alternatively, an audio alert 306 may be used to notify a human operator of an impending road hazard or impending change in autonomous vehicle capabilities. An audio alert 306 may emanate from speakers located around the interior of the vehicle. Audio alert 306 may include sounds designed to attract the attention of a human operator and/or voice commands directed to the human operator. For example, a voice command in the audio alert 306 may instruct the human operator to prepare for an increase in driving responsibility or signal to the human operator how much time is left until the human operator will be expected to exercise more or less control over the vehicle. The audio alert 306 may be made more intrusive or less intrusive to a human operator by varying the volume of the audio alert 306, including a sound reflective of the urgency of impending changes to the human operator's responsibilities (e.g., an alarm sound for an urgent hazard, a soft voice or bell for a less urgent hazard, etc.).

In at least one implementation, other visual alerts 308 are included to notify a human operator of an impending road hazard or impending change in autonomous vehicle capabilities. In one implementation, the visual alerts 308 include a light bulb (e.g., a light emitting diode) for flashing or steady illumination. In other implementations, the visual alerts 308 include an e-fabric display of images or colors on the interior of the vehicle (e.g., an alert symbol, a text message, a color indicating urgency, etc.). Like other alerting mechanisms in the vehicle, the visual alert 308 may be adjusted to be more intrusive or less intrusive to the human operation by varying the intensity of the alert (e.g., brightness of a light bulb), flashing the visual alert 308, changing the color of the visual alert 308, changing a message or symbol displayed by the visual alert 308, etc.

Figure 4:
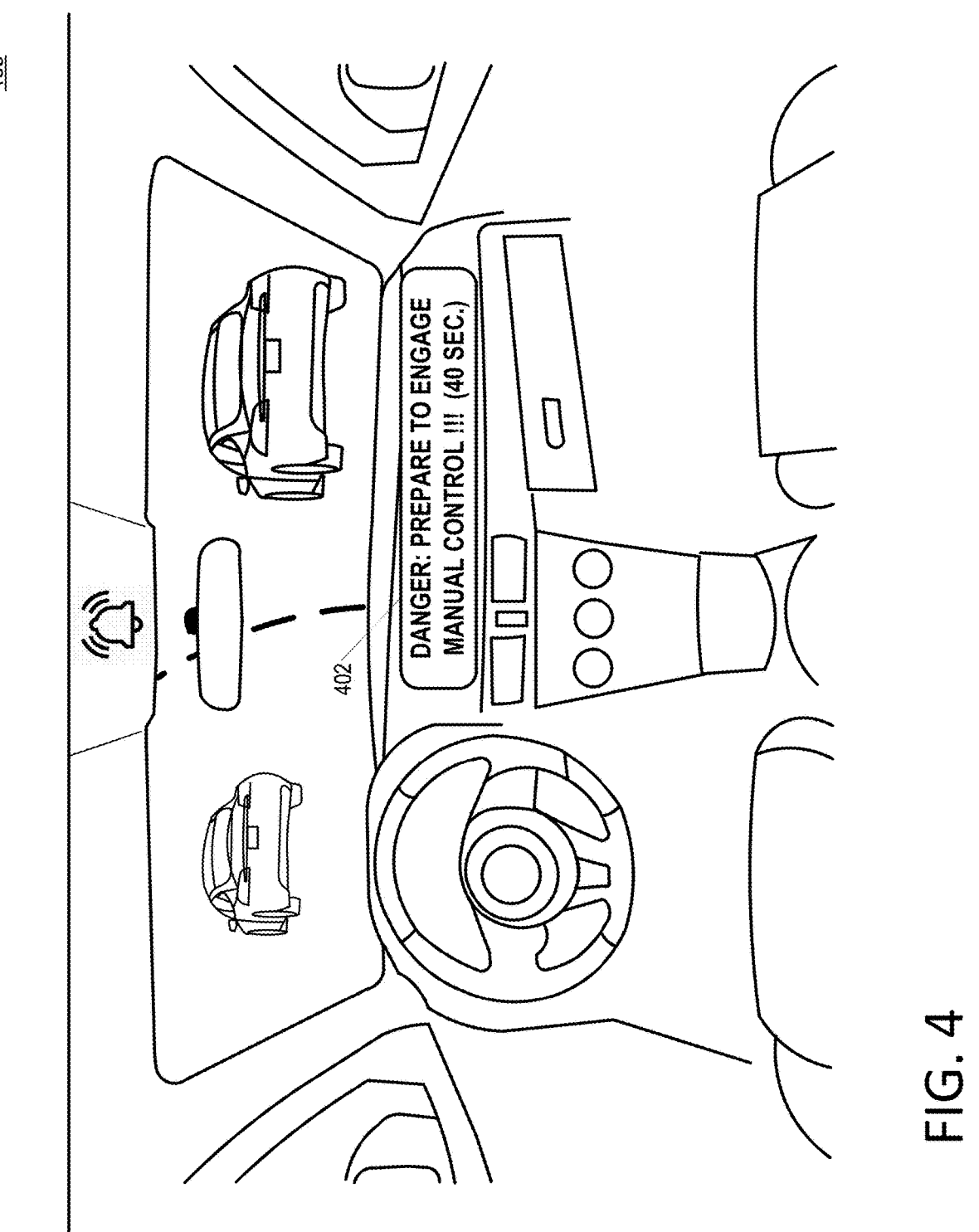
FIG. 4 is an in-vehicle view of an example system for manual control re-engagement in a vehicle.

FIG. 4 is an in-vehicle view of an example system for manual control re-engagement 400 in a vehicle. The system 400 includes a text display 402 for alerting a human operator of an impending change to autonomous vehicle capabilities of the vehicle. In the implementation illustrated in FIG. 4, the vehicle or another party has determined that an expected road hazard should not be navigated by the vehicle autonomously. Some road hazards (e.g., a rock slide) are very serious and seldom encountered by autonomous vehicle. It may not be known how well an autonomous vehicle is able to navigate such a hazard due to unpredictable conditions and infrequent collection of the behavior of autonomous vehicle in such a situation. In such cases, it may be determined that a human operator must quickly assume control of the vehicle.

The determination that an expected road hazard should not be navigated autonomously may be based on information collected by the vehicle itself or may be reported to the vehicle via a communications interface (e.g., other vehicles in the area may send reports that they are not successfully navigating a road hazard, an insurer may determine that human operators in general or a human operator in particular is more likely to safely navigate a road hazard than a vehicle under autonomous control, etc.). The text notification 402 may be accompanied by other notification methods (e.g., audio signal, haptic feedback, visual signals, etc.). The text notification may further include information such as an expected amount of time until a road hazard will be reached or an expected amount of time until a change to autonomous driving capabilities takes effect.

Figure 5:
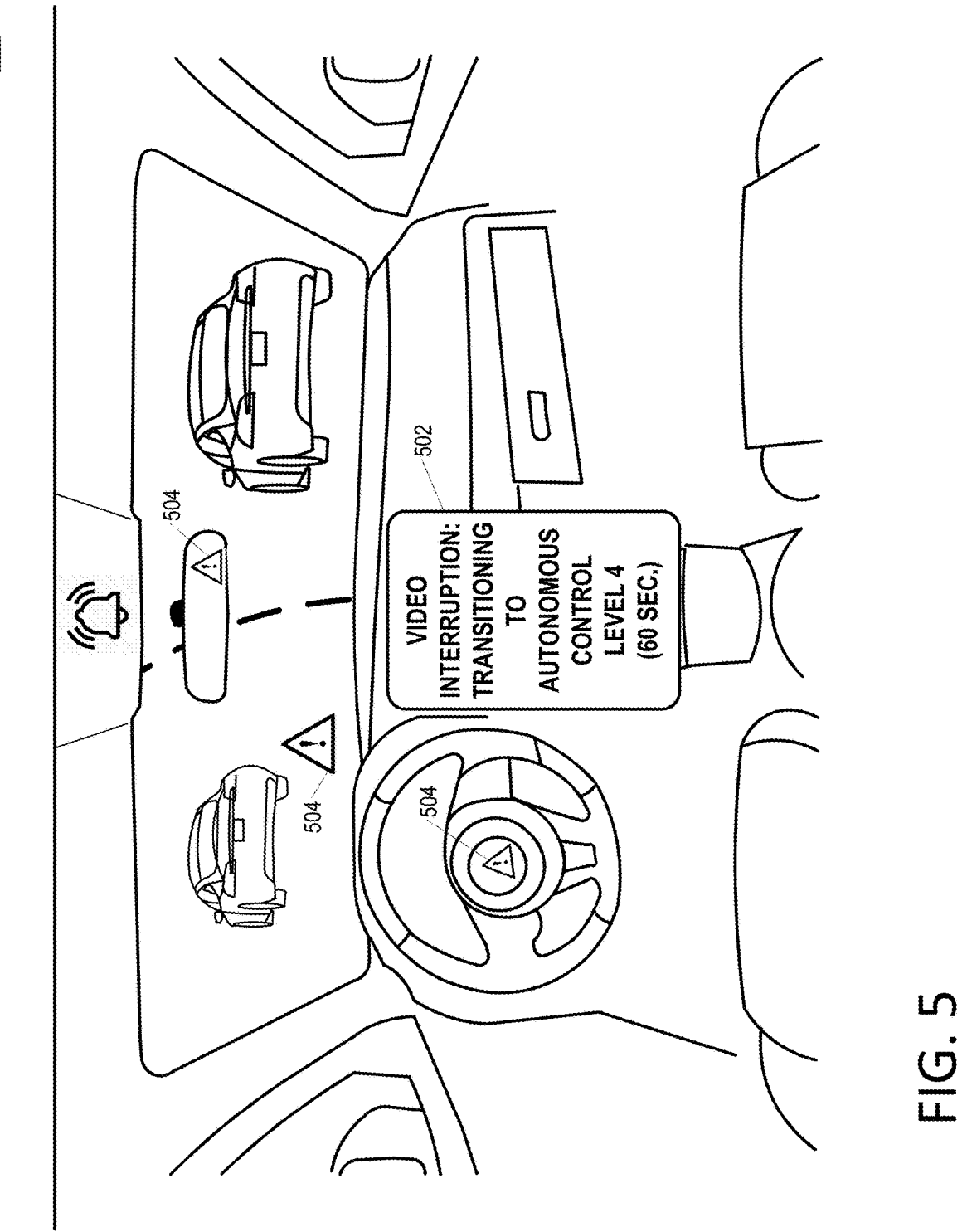
FIG. 5 is an in-vehicle view of an example system for manual control re-engagement in a vehicle.

FIG. 5 is an in-vehicle view of an example system for manual control re-engagement 500 in a vehicle. The system 500 includes a text notification 502. Like the text notifications disclosed herein with reference to other implementations, the text notification 502 includes a message to the human operator regarding an impending road hazard and/or an impending change to the autonomous capabilities of the vehicle. Text notification 502 may include a disruption to other content displayed inside the vehicle such as presentation of video, entertainment information (e.g., video games, web surfing, books, etc.), maps, etc. Interruption of other content may make the notification 502 more intrusive into the human operator's environment, which may be appropriate depending on the severity of the alert to be displayed.

The system 500 may include a warning alert 504 that may be displayed at various points around the interior of the vehicle. In at least one implementation, a warning alert 504 is displayed in locations wherein it is likely to attract the attention of a human operator. For example, the warning alert 504 may be displayed on a rear-view mirror, on the steering wheel, in a heads-up display on the windshield, etc. Whether a warning alert 504 is to be displayed depends in part on an urgency of attracting the human operator's attention based on the human operator parameters and alertness level of the human operator.

Figure 6:
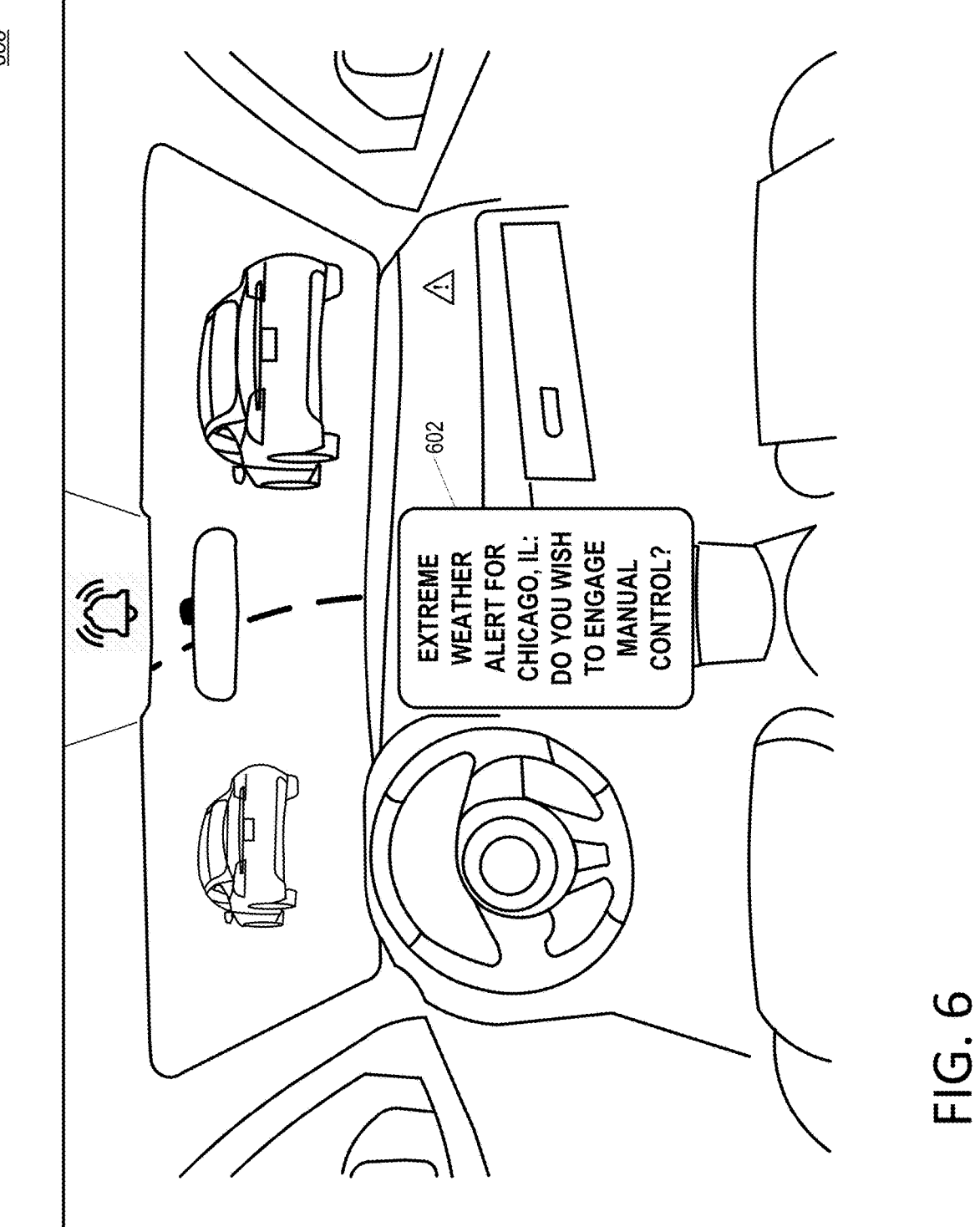
FIG. 6 is an in-vehicle view of an example system for manual control re-engagement in a vehicle.

FIG. 6 is an in-vehicle view of an example system for manual control re-engagement 600 in a vehicle. In the implementation illustrated in FIG. 6, a notification 602 includes a request to the human operator to adjust the level of autonomous control exercised by the vehicle. In some situations, the vehicle may determine or a third party may determine, that a vehicle is likely to be navigated more safely autonomously than by the human operator. Examples of third party entities that may make such a determination include a vehicle manufacturer, a government agency, an insurer, a vehicle owner, etc. The vehicle or the third parties may also determine that a vehicle is likely to be operated more safely manually than autonomously in certain situations. In the example illustrated in FIG. 6, an extreme weather alert issued from a weather service initiates a request to the human operator to agree to allow the vehicle reduce or eliminate autonomous capabilities in favor of manual control. A human operator may interact with the notification 602 directly or by other controls in the interior of the vehicle to accept the request presented in notification 602.

Figure 7:
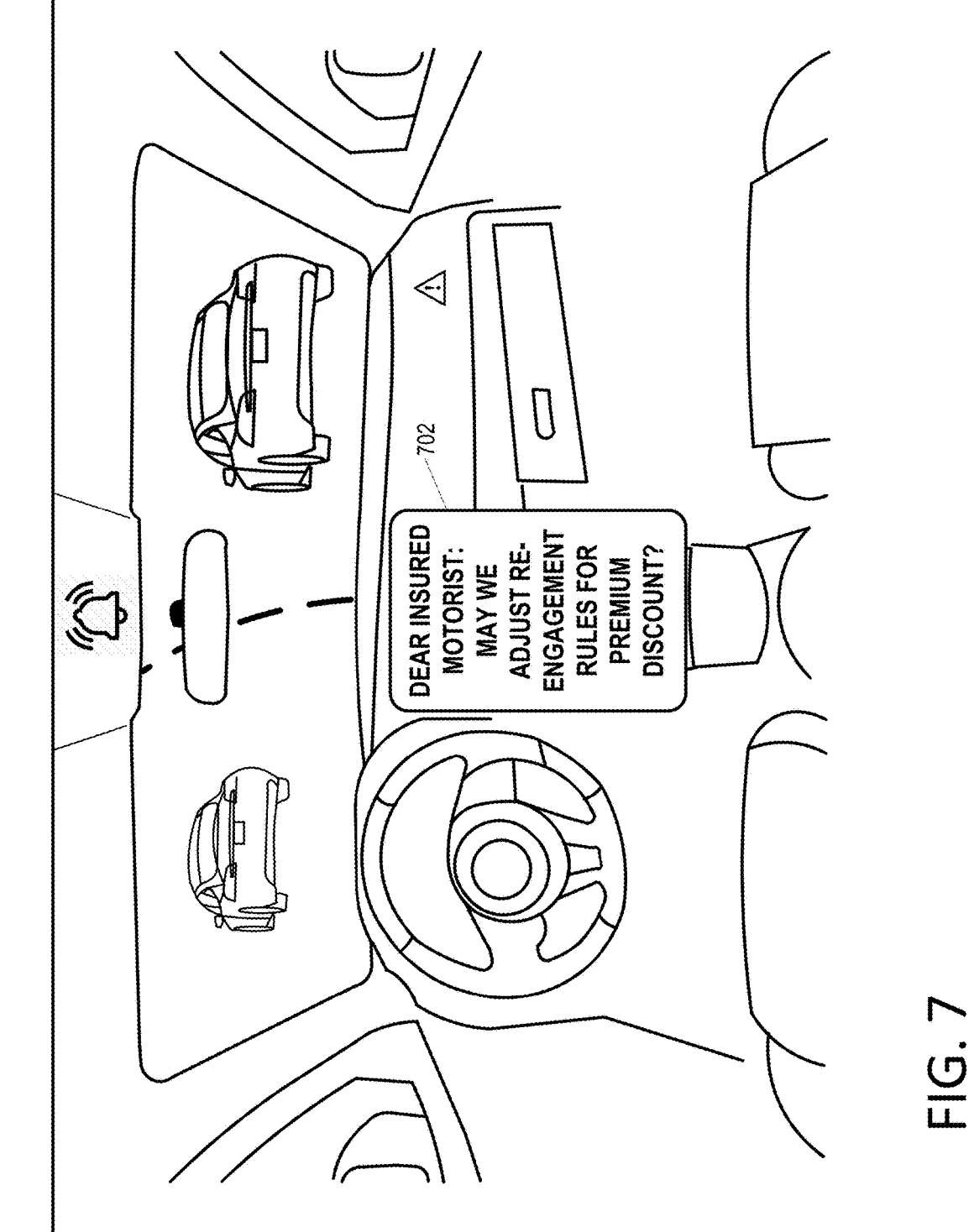
FIG. 7 is an in-vehicle view of an example system for manual control re-engagement in a vehicle.

FIG. 7 is an in-vehicle view of an example system for manual control re-engagement 700 in an autonomous vehicle. In at least one implementation, an insurer determines whether a human operator or a vehicle is more likely to safely navigate the vehicle in certain conditions. The insurer initiates a request to the human operator to be displayed as notification 702. The notification 702 may include an offer from an insurer to lower insurance premium prices in return for the human operator's agreement to allow the vehicle to assume a greater or lesser degree of autonomous control over road navigation depending on the rules preferred by the insurer. Rules preferred by the insurer may depend on factors such as the human operator parameters measured inside the vehicle, a driving history of the particular human operator in the vehicle, and data gathered regarding events outside the vehicle.

Figure 8:
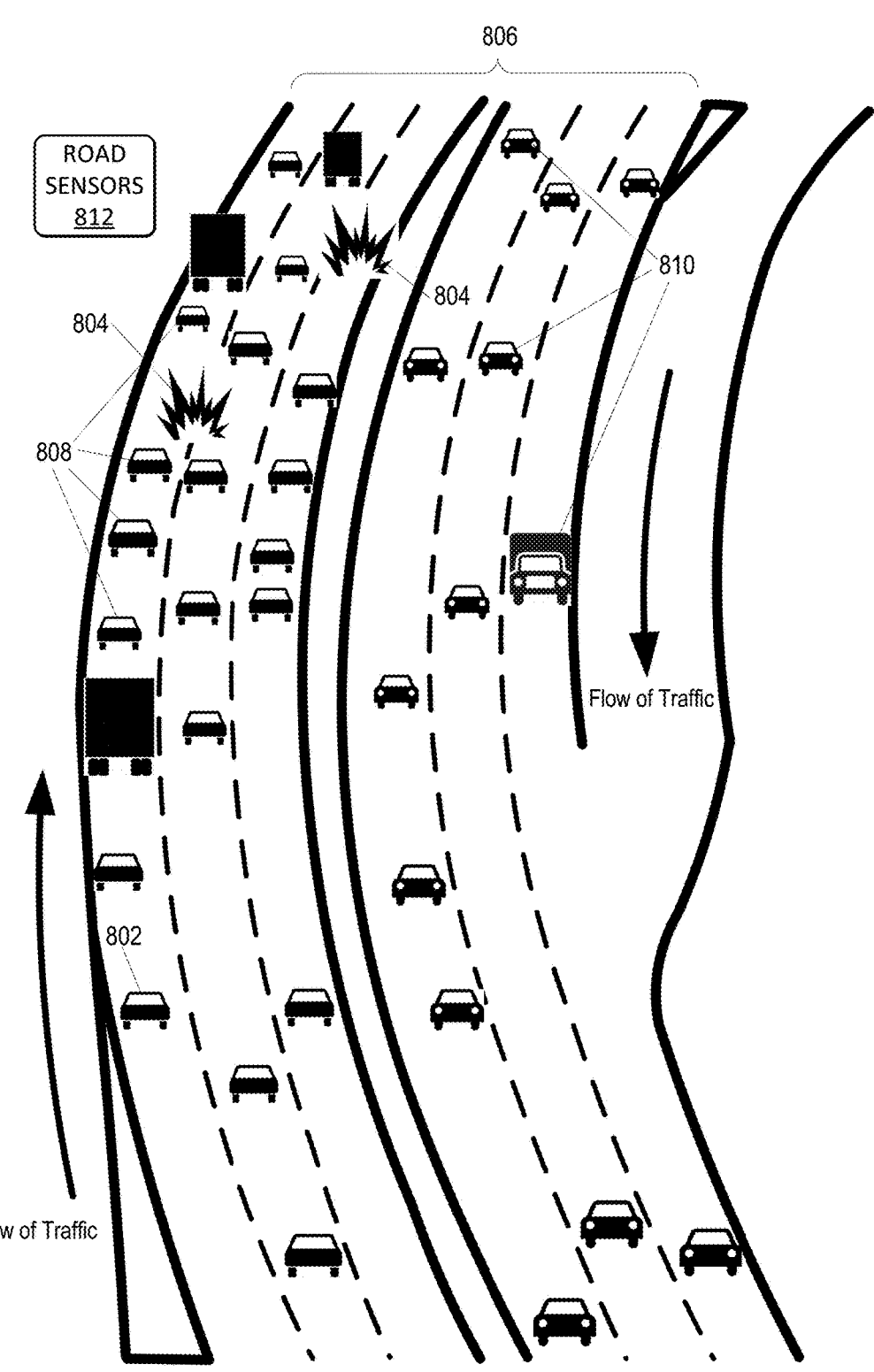
FIG. 8 is a schematic diagram of a vehicle equipped with an example system for manual control re-engagement in a vehicle approaching a road hazard.

FIG. 8 is a schematic diagram 800 of a vehicle 802 equipped with an example system for manual control re-engagement in an autonomous vehicle approaching a road hazard 804 on a road 806. Under some circumstances, it may be safer for the vehicle 802 to alter available autonomous capabilities to more safely navigate the road hazard 804. To make a determination whether it is safer to alter autonomous vehicle capabilities or to remain in the status quo, the vehicle detects a variety of human operator parameters regarding a human operator of the vehicle to determine a human operator alertness level.

Also relevant to a determination of whether it is safer to alter autonomous vehicle capabilities of the vehicle 802 is an assessment of conditions on the road 806 and of the road hazards 804. In at least one implementation, the vehicle 802 receives information regarding conditions on the road 806 and of the road hazard 804 from other vehicles and from sensors in the road 806 itself.

The vehicle 802 includes components for managing a transition from one level of autonomous capabilities to another level of autonomous capabilities. One type of component to manage the transition is an evaluator in the vehicle 802 to evaluator to evaluate readiness of a human operator of a vehicle including one or more sensors. A security arbiter in the vehicle 802 determines a security risk to the vehicle (e.g., a road hazard, adverse conditions, diminished capacity of a human operator, etc.) and determines whether a level of autonomous capability of the vehicle should be adjusted by adding or removing autonomous capabilities and conversely adding or removing driving responsibility from a human operator. The security arbiter in the vehicle 802 may receive human input parameters directly from the human operator and/or from a remote party.

In at least one implementation, the security arbiter in the vehicle 802 evaluates a threat posed by the road hazard 804. The security arbiter may receive information regarding the threat from other road participants and remote parties. For example, vehicles 808 traveling in the same direction as the vehicle 802 but closer to the road hazard 804 may wirelessly relay information back to vehicle 802 and the other vehicles approaching the road hazard 804 on the road 806 behind the vehicles 808. The security arbiter may receive indications, for example without limitation that the vehicles 808 have encountered sharply lower road speeds or have observed adverse road conditions. The vehicles 808 may further relay information to the vehicle 802 regarding the location of the road hazards 804 on the road 806. The vehicles 808 may include telematics data in the information sent to the security arbiter in the vehicle 802 (e.g., heavy braking, high G-forces, etc.) As another example, third parties (e.g., government agencies, insurers, vehicle owners, etc.) may collect information regarding the conditions on the road 806 by way of remote sensors 812. The remote sensors 812 may detect road speeds and be able to determine whether vehicles are in distress or if a dangerous condition has developed on the road 806. Remote sensors 812 may be fixed in place roadside (e.g., vibration sensor, vehicle counter, camera, etc.) or may be mobile sensors (e.g., drone, unmanned aerial vehicle, helicopter, etc.).

After receiving data regarding the road hazard 804, the security arbiter may determine a security threat to the vehicle based on the road hazard 804 and other information available to the security arbiter. The security arbiter may further determine a change to autonomous vehicle capabilities that should be taken to improve safety when navigating the road hazard 804. Such a determination may be based on information available to the security arbiter or it may be an instruction received from a third party. The security arbiter may further determine a time period during which the change in the vehicle's autonomous capability should occur.

Another component in the vehicle 802 is a notification server. The notification server in the vehicle 802 may include hardware and software components (e.g., a display for text messages to a human operator inside the vehicle, speakers for playing audio text notifications and instructions, lights, feedback devices, an operating system, microphones, etc.) for presenting information to and receiving information from a human operator of the vehicle 802. The notification server presents notifications to a human operator of the vehicle 802. In at least one implementation, the security arbiter determines a time period and an intrusiveness level of After receiving data regarding the road hazard 804, the security arbiter may select a time period during which the vehicle should transition to a different level of autonomous capability. The time period may be calibrated based on the speed of the vehicle 802 on the road 806, the location of the road hazards 804, information received from vehicles 808, etc. In at least one implementation, the security arbiter may decrease speed of the vehicle to lengthen the time until the vehicle 802 reaches the road hazard 804. In at least one implementation, the security arbiter provides a time period to the notification server of the vehicle 802 during which changes to the vehicle's autonomous capabilities should be made. In implementations, a security arbiter requests the notification server to require human operator acknowledgement before implementing changes to the autonomous capabilities of the vehicle 802. In another implementation, the security arbiter will cease navigation of the vehicle if the human operator does not acknowledge increased driving responsibilities. In other implementations, the security arbiter implements a change in the autonomous capabilities of the vehicle 802.

Figure 9:
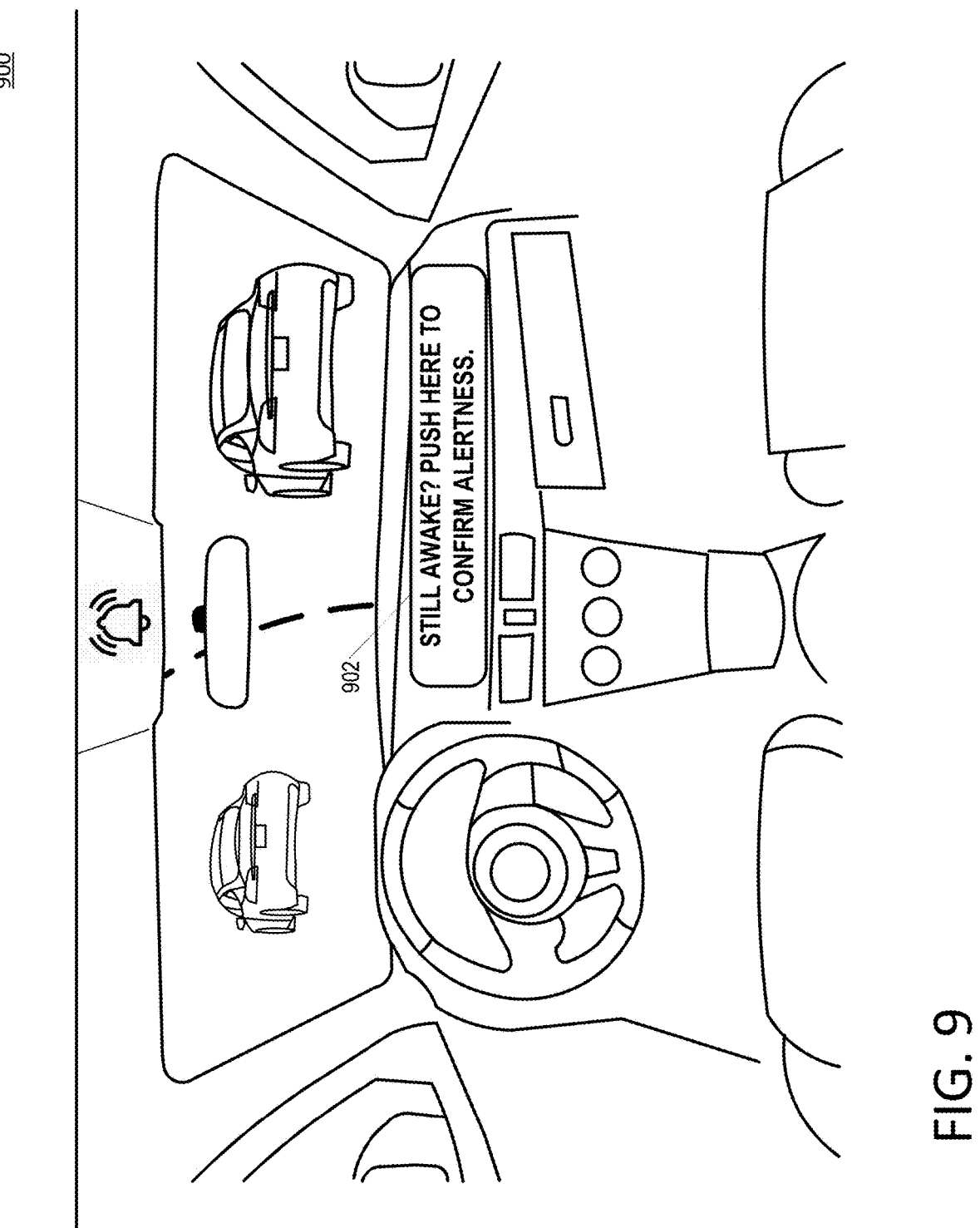
FIG. 9 is an in-vehicle view of an example system for manual control re-engagement in a vehicle.

FIG. 9 is an in-vehicle view of an example system 900 for manual control re-engagement in a vehicle. The system 900 includes a text notification 902 including request for acknowledgement from the human operator. The text notification 902 may serve as a "ping" to the human operator to test for responsiveness. When a human operator responds to the text notification 902 (e.g., through a touch interface, pushing a button, speaking a response into a microphone, etc.), the system 900 (e.g., a security arbiter on the vehicle) may record a responsiveness time associated with the human operator's acknowledgement of the text notification 902. An intrusiveness level of the text notification 902 may be varied to test the human operator's reaction to different levels of intrusiveness. Some human operators may react well to minimally intrusive notifications and find more intrusive notifications to be irritating. Other human operators, on the other hand, may not respond well to minimally intrusive notifications and may need more intrusive notifications to respond to a request by the vehicle to assume more driving responsibility.

FIG. 10 illustrates example operations 1000 for requesting engagement of manual control in a vehicle. An identifying operation 1002 identifies a human operator of a vehicle, the human operator being associated with a driving capability profile. The identifying operation 1002 may rely on sensors inside the vehicle to identify the human operator (e.g., facial recognition) or the identifying operation may identify the human operator of the vehicle via credentials (e.g., bio credentials, answering a cryptographic challenge, username and password, possession of a physical vehicle key, etc.). The driving capability profile may be formed from data collected regarding the human operator. The data regarding the human operator may include driving history data such as previous reactions to road hazards, previous vehicle crashes, data regarding the type of notifications the human operator tends to respond well to, the amount of time the human operator typically needs to respond to a notification, the amount of time the human operator typically needs to acknowledge an acknowledgement request, types of road conditions under which the human operator typically exhibits good or poor driving skills, the frequency with which the human operator becomes intoxicated or otherwise experiences diminished driving capabilities, the human operator's schedule, whether the human operator is likely to be sleep-deprived, etc.

A determining operation 1004 determines human operator parameters associated with the human operator. The determining operation 1004 may include sensors inside the vehicle to collect biometric data regarding the human operator (e.g., camera, heart rate sensor, perspiration sensor, steering wheel grip force sensor, body temperature sensor, movement sensors, microphones, etc.). The determining operation 1004 may also rely on information about the human operator stored by the vehicle or communicated to the vehicle such as demographic information regarding the human operator (age, gender, length of driving experience, etc.) and historical information regarding the human operator's usage of the vehicle.

Another determining operation 1006 determines an alertness level of the human operator based on the human operator parameters and the driving capability profile. The determining operation 1006 may include a determination of an amount of time the human operator is likely to need to respond to notifications of various levels of intrusiveness.

A displaying operation 1008 displays a manual control request notification to the human operator. The manual control request notification may be based on the determined alertness level of the human operator. If the determining operation 1006 determines that a human operator has a low alertness level, then the displaying operation 1008 may display a more intrusive notification to the human operator and may display the notification earlier than if the human operator has a high alertness level. If the determining operation 1007 determines that a human operator has a high alertness level and the driving capability profile and/or the human operator parameters indicate that the human operator responds well to a certain type of notification, then the displaying operation 1008 may display that notification to the human operator.

A transferring operation 1010 transfers control of the vehicle to the human operator if the human operator accepts the request for manual control displayed in operation 1008. In one implementation, a human operator accepts the request for manual control by interfacing with an input such as a touch interface or control inside the vehicle. In another implementation, the human operator accepts the request for manual control by moving the vehicle controls (e.g., steering wheel, brake pedal, etc.).

Figure 11:
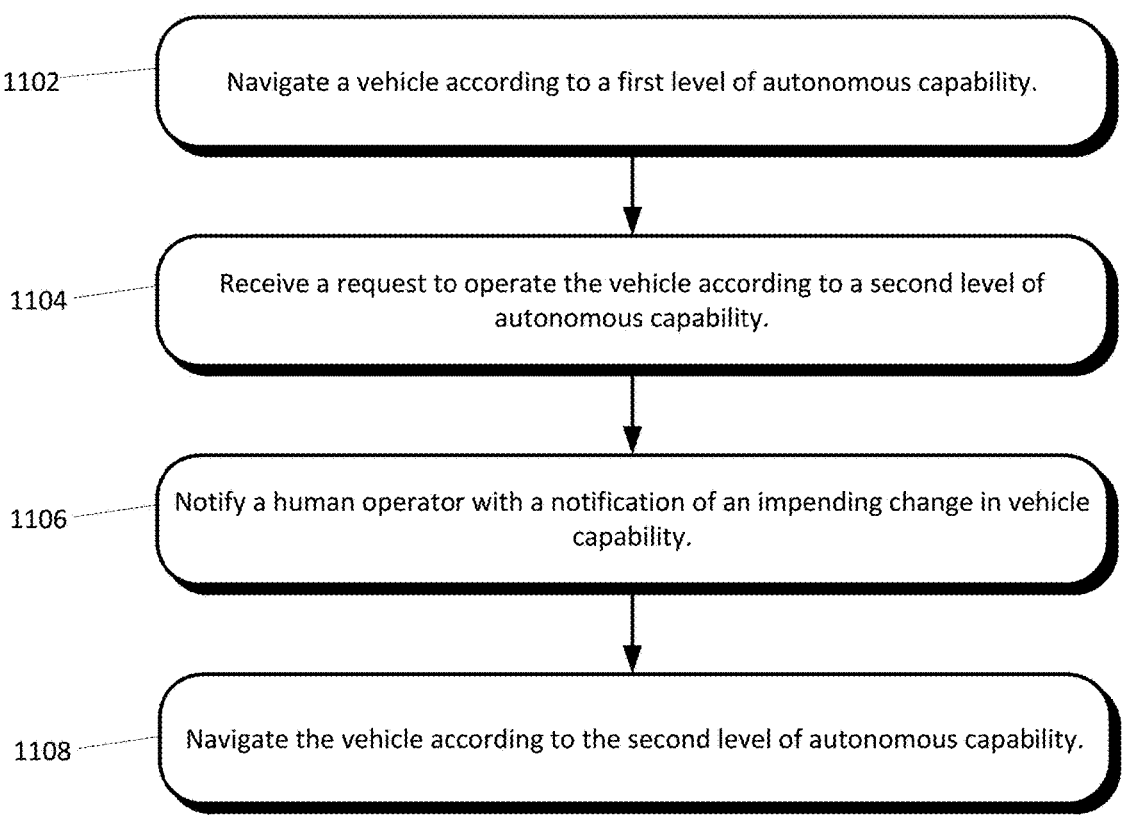
FIG. 11 illustrates example operations for transitioning control of a vehicle.

FIG. 11 illustrates example operations 1100 for transitioning control of a vehicle. A navigating step 1102 navigates a vehicle according to a first level of autonomous capability. The first level of autonomous capability includes a set of autonomous competencies exercised by the vehicle while it is operating according to the first level of autonomous capability. Autonomous capabilities include without limitation adaptive cruise control, parking assist (steering only), lane assist, full parking assist, traffic jam assist, conditional automation, high automation, and full automation. These autonomous capabilities may be organized according to ascending levels (e.g., Levels 0-5) as the autonomous competencies take over more and more driving responsibilities from a human operator. A vehicle navigating according to a first level of autonomous capability exercise some (or all) of these autonomous competencies, depending on which autonomous competencies are included in the first level. For example, if the first level of autonomous capability is Level 3 autonomous capability, then a vehicle navigating according to the first level of autonomous capability may exercise lane assist and parking assist, but not conditional automation.

A receiving operation 1104 receives a request to operate the vehicle according to a second level of autonomous capability. The receiving operation 1104 may receive the request from an entity separate from the vehicle itself. For example without limitation, a government agency monitoring road conditions, a vehicle manufacturer, an insurer, a vehicle owner, etc. may send a request to the vehicle to operator according to a second level of autonomous capability. In another implementation, the vehicle itself may determine that navigation is likely to be safer if the vehicle shifts to a different level of autonomous capability. For example, a security arbiter on the vehicle may evaluate human operator parameters and a human operator alertness level in comparison to any known or expected road hazard to create the request to operate the vehicle according to the second level of autonomous capability, and the vehicle may perform the receiving operation 1104 in response to the security arbiter's request.

A notifying operation 1106 notifies a human operator with a notification of an impending change to the vehicle's autonomous capabilities. In one implementation, the notifying operation 1106 is performed by a notification server on the vehicle. The notification may be adjusted by the notification server to be more intrusive or less intrusive to the human operator depending on the information conveyed therein. For example, if the impending change in vehicle capability includes a reduction to the driving responsibilities of the human operator, a less intrusive notification may be selected. On the other hand, if the impending change in vehicle capability includes an increase in driving responsibility of the human operator, then a more intrusive notification may be used. A navigating step 1108 navigates the vehicle according to the second level of autonomous capability.

Of course, the applications and benefits of the systems, methods and techniques described herein are not limited to only the above examples. Many other applications and benefits are possible by using the systems, methods and techniques described herein.

Furthermore, when implemented, any of the methods and techniques described herein or portions thereof may be performed by executing software stored in one or more non-transitory, tangible, computer readable storage media or memories such as magnetic disks, laser disks, optical discs, semiconductor memories, biological memories, other memory devices, or other storage media, in a RAM or ROM of a computer or processor, etc.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed:

1. A system for transferring control of a vehicle to a human operator, the system comprising:

a notification server configured to display a first manual control request notification to the human operator, the first manual control request notification being based at least in part on the readiness of the human operator and a security threat to the vehicle; and the notification server being further configured to display a second manual control request notification to the human operator, the second manual control request notification being different from the first manual control request notification, wherein the first manual control request notification is based at least in part on a body position of the human operator.

2. The system of claim 1, wherein the first manual control request notification is based at least in part on a time until the vehicle reaches a location of the security threat.

3. The system of claim 1, wherein the first manual control request notification is based at least in part on a history of previous reactions to manual control requests by the human operator.

4. The system of claim 1, wherein control of the vehicle is transferred by a vehicle security arbiter to the human operator.

5. The system of claim 1, wherein the first manual control request notification is based at least in part on a time of day.

6. The system of claim 1, wherein the first manual control request notification is based at least in part on a vehicle on road hazard data communicated to the vehicle.

7. The system of claim 1 further comprising:

an evaluator configured to evaluate readiness of a human operator of a vehicle, the evaluator including one or more sensors, wherein the evaluator is further configured to determine the readiness of the human operator based at least in part on a responsiveness test of the human operator.

8. The system of claim 7, wherein the responsiveness test is based at least in part on a physical response from the human operator.

9. The system of claim 8, wherein the physical response from the human operator is at least one of a touch response and a vocal response.

10. The system of claim 1, wherein the first manual control request notification is further based, at least in part, on a detected road hazard.

11. A method for transferring control of a vehicle to a human operator, the method comprising:

displaying a first manual control request notification to the human operator, the first manual control request notification being based at least in part on a readiness of the human operator and a security threat to the vehicle; and displaying a second manual control request notification to the human operator, the second manual control request notification being different from the first manual control request notification, wherein displaying the first manual control request notification comprises displaying the first manual control request notification based, at least in part, on a body position of the human operator.

12. The method of claim 11, wherein displaying the first manual control request notification comprises displaying the first manual control request notification based, at least in part, on a time until the vehicle reaches a location of the security threat.

13. The method of claim 11, wherein displaying the first manual control request notification comprises displaying the first manual control request notification based, at least in part, on a history of previous reactions to manual control requests by the human operator.

14. The method of claim 11 further comprising transferring control of the vehicle to the human operator.

15. The method of claim 11, wherein displaying the first manual control request notification comprises displaying the first manual control request notification based, at least in part, on a time of day.

16. The method of claim 11, wherein displaying the first manual control request notification comprises displaying the first manual control request notification based, at least in part, on a vehicle on road hazard data communicated to the vehicle.

17. The method of claim 11 further comprising:

evaluating, via one or more sensors, a readiness of a human operator of a vehicle, wherein evaluating the readiness comprises determining the readiness based, at least in part, on a responsiveness test of the human operator.

18. The method of claim 17, wherein the responsiveness test is based at least in part on a physical response from the human operator.

19. The method of claim 18, wherein the physical response from the human operator is at least one of a touch response and a vocal response.

20. The method of claim 11, wherein displaying the first manual control request notification comprises displaying the first manual control request notification based, at least in part, on the first manual control request notification is further based, at least in part, on a detected road hazard.

\* \* \* \* \*